Nov. 8, 1966 G. DIRKS 3,284,579
MAGNETIC RECORDING AND READING HEAD MOUNTING ASSEMBLY
Original Filed Jan. 9, 1959
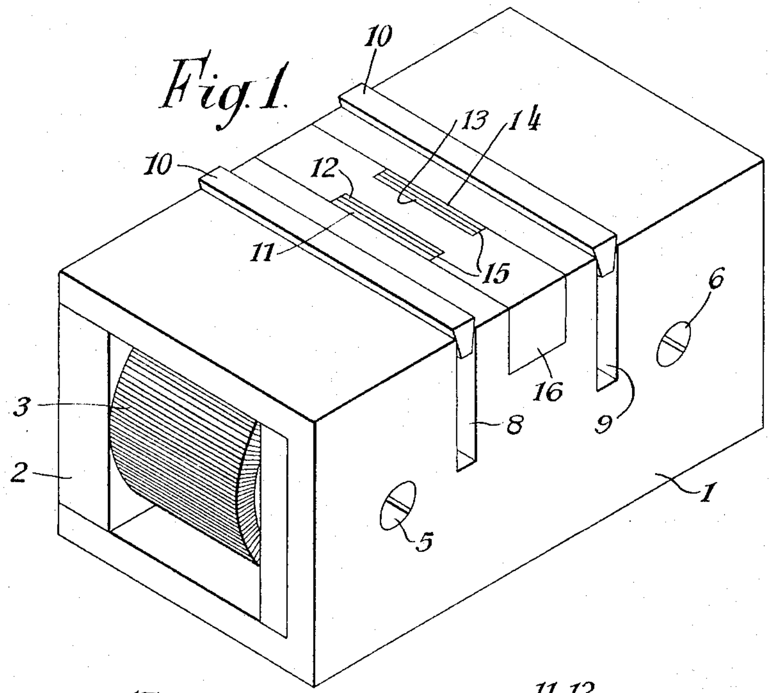
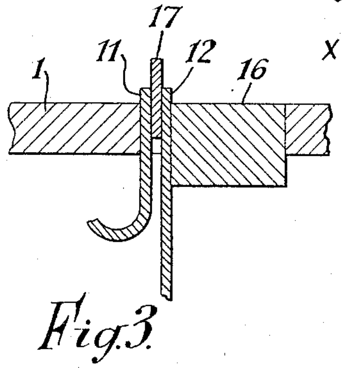
Fig. 3
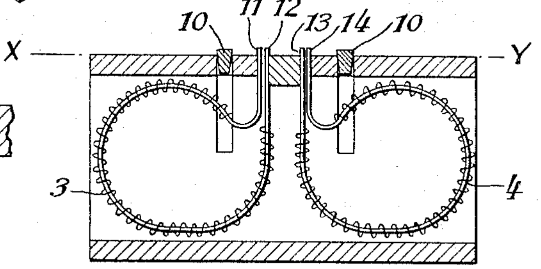
Fig. 2
INVENTOR
GERHARD DIRKS
BY Joseph Weingarten
ATTORNEY 3,284,579

MAGNETIC RECORDING AND READING HEAD MOUNTING ASSEMBLY

Gerhard Dirks, 12120 Edgecliff Place, Los Altos Hills, Calif.

Continuation of application Ser. No. 785,848, Jan. 9, 1959. This application July 10, 1961, Ser. No. 123,957
Claims priority, application Great Britain, Jan. 15, 1958, 1,368/58
4 Claims. (Cl. 179—100.2)

This application is a continuation of copending patent application Serial No. 785,848 filed January 9, 1959, and now abandoned, and entitled, Magnetic Recording and Reading Apparatus.

The present invention relates to magnetic recording and reading apparatus.

It is an object of the invention to provide a magnetic reading or writing head in which a core of magnetic material upon which a coil is wound is formed into its final shape and clamped in a holder to retain it in that shape.

It is a further object of the invention to position the ends of the core of a magnetic reading or writing head to form a gap of predetermined size and to retain the ends in that position by wedges.

It is still another object of the invention to provide a head assembly for a magnetic recording or reading apparatus in which two reading or writing heads are mounted in a single mounting block.

According to one feature of the invention a magnetic head assembly includes a mounting block of non-magnetic material, first and second adjacent slots in one face of the block, a magnetic head, the first slot being adapted to accommodate the pole pieces of the head, and a wedge inserted in the second slot and adapted to deform the block sufficiently to clamp the pole pieces in position in the first slot.

According to another feature of the invention a magnetic head assembly includes a mounting block of non-magnetic material, at least two pairs of adjacent slots in one face of the block, a magnetic head for each pair of slots, the pole pieces of each head being accommodated in one slot of each pair, and a wedge inserted in the second slot of each pair, the wedge being adapted to deform the block sufficiently to clamp in position the pole pieces of the associated head.

The invention will now be described, by way of example, with reference to the accompanying drawing, in which, FIGURE 1 shows a head assembly, FIGURE 2 shows diagrammatically the arrangement of two reading or writing heads in the assembly, and FIGURE 3 shows the arrangement of parts of the assembly during manufacture.

A reading or writing head used in magnetic reading or recording apparatus consists of a core of suitable magnetic material upon which one or more coils are wound. The core may consist of one or more suitable shaped members and in one common form of head the core is shaped so that its ends are brought into close proximity to form a gap in the magnetic circuit. This gap is required to be held to close dimensional tolerance. The core thus forms a virtually closed loop, and the coil or coils may be wound by repeatedly passing the end of a length of wire through the center of the loop. However, the winding of a coil in this way is laborious and time consuming.

The head assembly shown in FIGURES 1 and 2 consists of a pair of heads 3 and 4 mounted in a mounting block. Each head consists of a strip of relatively flexible magnetic material, preferably having a high permeability, upon which a coil is wound.

In order to simplify winding, the coil is wound upon the strip before the strip is shaped. For this purpose the strip may be covered by a layer of an insulating tape and placed in a rotating holder while the wire is fed on to it, or it may be conveniently wound manually. Winding in this way allows a high impedance coil to be wound rapidly and easily, and in many applications this may reduce the quantity of auxiliary apparatus, for example, matching transformers, required when the head is used.

After winding the strip is formed into the shape shown in FIGURE 2, resembling a circle with one end leaving the circle tangentially, the other end being bent to lie parallel to the first, the two ends forming the pole pieces of the head.

The two heads 3 and 4, after being produced as described are mounted in a suitable block, and for this purpose it is convenient to clamp them between two plates 2 and 7 (FIGURE 1). It will be appreciated, however, that the purpose of these plates is to support the heads while the ends are adjusted to the correct spacing, and that other means for supporting them may be employed. For example, the plate 2 may be provided with bosses upon which the heads may be mounted, or alternatively, each head may be formed round a bobbin which is, in turn, secured to the plate 2.

In order to mount the two heads so that their gaps are close together they are arranged back-to-back as shown in FIGURE 2, and the ends 11 and 12 of the head 3 are separated from the ends 13 and 14 of the head 4 by means of a block 16 of non-magnetic material, such as brass or a suitable synthetic plastic material. Two slots 15 are provided in opposite sides of the block 16 to receive the ends 11 to 14 of the heads. The separation between the head gaps is therefore determined by the dimension of the block 16 between the slots 15. The slots 15 are arranged to be equal in depth to twice the thickness of the strip of material forming the heads plus the required head gap spacing.

The head mounting plate or plates, such as 2 and 7 together with the heads and the block 16 are then assembled in a mounting block 1, which is a channel-section block of non-magnetic material, such as brass. The case is provided with two slots 8 and 9. Spacing pieces 17 of non-magnetic material, beryllium-copper alloy foil has been found to be satisfactory, are now inserted, as shown in FIGURE 3, between the ends of the heads 11 and 12, and 13 and 14. The thickness of these spacing pieces determines the gap width of the pole pieces of each of the heads. The mounting plates are secured, for example, by means of screws 5 and 6 to the case 1 to retain the heads within the assembly.

The protruding ends 11 to 14 are now locked in position by pressing wedges 10 into the slots 8 and 9, as shown in FIGURE 1. The action of these wedges is such that the ends of the strips, the block 16 and the spacers 17 are all firmly clamped. Thus the critical dimensions, the head gaps and the head separation, are determined accurately by the dimensions of the block 16 and the spacers 17.

The upper surface of the assembly, shown by the line X–Y in FIGURE 2 is then processed to render it flat, the protruding parts of the wedges and the ends of the strips and spacers being removed, for example, by a grinding machine operation.

It will be appreciated that the mounting plate for the heads may be omitted, the heads being held by the clamping action of the wedges and supported against movement inside the assembly by flexible supports or additional wedges. The case 1 may then resemble an open-ended box. The block 16 may also be omitted, the slots 15 then being cut in one face of the case. In this case it is necessary to provide relief slots extending from the slots 15 and part the way down the vertical side of the case so that the action of the wedges 10 in clamping the ends of the strips is permitted to take place.

Further it may also be desirable to relieve the slots 15 in the interior of the case to provide a funnel-shaped opening to facilitate the insertion of the ends of the core into the slots.

The use of the wedges 10 to clamp the head into position also allows a head to be changed for maintenance purposes. To replace a faulty head, for example, it is merely necessary to withdraw the appropriate wedge and the head may then be removed. A replacement head is inserted in the same way as for the original head.

It will be appreciated that instead of using clips or bobbins to locate the heads within the assembly the case may alternatively be filled with a suitable potting resin or wax after the assembly is complete. This has the additional advantage that the heads and windings are protected from mechanical damage and from adverse climatic conditions.

Furthermore, while the method of manufacturing an assembly containing a pair of heads has been described it will be appreciated that a single head or an assembly containing a greater number of heads may be manufactured in the same way.

In a multiple-head assembly the heads may be arranged side-by-side or in staggered formation instead of parallel.

What I claim is:

1. A mounting assembly comprising, in combination, a mounting block of non-magnetic material, said mounting block having a substantially planar face having a channel formed therein and a slot formed in the face of said mounting block in parallel and spaced relation to said channel so as to form a deformable portion between said slot and said channel in the face of said mounting block; a block arranged in said channel and having a side face at least a portion of which is spaced from a face of said channel forming a gap between said face portion of said block and said face of said channel; a magnetic head mounted in said gap; and a wedge inserted in said first-mentioned slot so as to deform the deformable portion of the face of said mounting block and thereby clamp said magnetic head in position in said gap between said block and said mounting block.

2. A mounting assembly comprising, in combination, a mounting block of non-magnetic material, said mounting block having a substantially planar face having a channel formed therein and a slot formed in the face of said mounting block in parallel and spaced relation to said channel so as to form a deformable portion between said slot and said channel in the face of said mounting block; a block adapted to fit into said channel and having a side face adapted to abut a face of said channel and a top face adapted to be coplanar with the planar face of said mounting block, said block having a slot formed therein in the side face thereof and extending from the top face thereof; a magnetic head mounted in said last-mentioned slot, said magnetic head comprising a pair of pole pieces separated by an interposed non-magnetic spacer, the pole pieces and spacer of said magnetic head being mounted in said last-mentioned slot; and a wedge inserted in said first-mentioned slot so as to deform the deformable portion of the face of said mounting block and thereby clamp said magnetic head in position in the slot between said block and said mounting block.

3. A mounting assembly comprising, in combination, a mounting block of non-magnetic material, said mounting block having a substantially planar face having a channel formed therein, a first slot formed in the face of said mounting block on one side of said channel in parallel and spaced relation to said channel so as to form a deformable portion between said first slot and said channel in the face of said mounting block, and a second slot formed in the face of said mounting block on the opposite side of said channel in parallel and spaced relation to said channel so as to form a deformable portion between said second slot and said channel in the face of said mounting block; a block adapted to fit into said channel and having a first side face adapted to abut a first face of said channel, a second side face adapted to abut a second face of said channel, and a top face extending between said first and second side faces and adapted to be coplanar with the planar face of said mounting block, said block having a first slot formed therein in the first side face thereof and extending from the top face thereof and a second slot formed therein in the second side face thereof and extending from the top face thereof; a magnetic head mounted in each of said first and second slots of said block; and a wedge inserted in each of said first and second slots of said mounting block so as to deform the deformable portions of the face of said mounting block and thereby clamp said magnetic heads in position in the first and second slots of said block between said block and said mounting block.

4. A mounting assembly comprising, in combination, a mounting block of non-magnetic material, said mounting block having a substantially planar face having a channel formed therein, a first slot formed in the face of said mounting block on one side of said channel in parallel and spaced relation to said channel so as to form a deformable portion between said first slot and said channel in the face of said mounting block, and a second slot formed in the face of said mounting block on the opposite side of said channel in parallel and spaced relation to said channel so as to form a deformable portion between said second slot and said channel in the face of said mounting block; a block adapted to fit into said channel and having a first side face adapted to abut a first face of said channel, a second side face adapted to abut a second face of said channel, and a top face extending between said first and second side faces and adapted to be coplanar with the planar face of said mounting block, said block having a first slot formed therein in the first side face thereof and extending from the top face thereof and a second slot formed therein in the second side face thereof and extending from the top face thereof; a magnetic head mounted in each of said first and second slots of said block, each of said magnetic heads comprising a pair of pole pieces separated by an interposed non-magnetic spacer, the pole pieces and spacer of each of said magnetic heads being mounted in its slot of said block between said block and said mounting block; and a wedge inserted in each of said first and second slots of said mounting block so as to deform the deformable portions of the face of said mounting block and thereby clamp said magnetic heads in position in the first and second slots of said block between said block and said mounting block.

References Cited by the Examiner

UNITED STATES PATENTS

| | | | |
|---|---|---|---|
| 1,391,097 | 9/1921 | Cowles | 340—174.1 |
| 2,469,444 | 5/1949 | Roys | 179—100.2 |
| 2,668,878 | 2/1954 | Monroe | 179—100.2 |
| 2,756,280 | 7/1956 | Rettinger | 179—100.2 |
| 3,001,181 | 9/1961 | Taft | 340—174.1 |

FOREIGN PATENTS 784,572 10/1957 Great Britain.

BERNARD KONICK, *Primary Examiner.*

J. R. GOUDEAU, J. MOFFITT, *Assistant Examiners.*